(12) United States Patent
Kusafuka

(10) Patent No.: US 12,022,055 B2
(45) Date of Patent: Jun. 25, 2024

(54) THREE-DIMENSIONAL DISPLAY DEVICE, HEAD-UP DISPLAY SYSTEM, AND MOVABLE OBJECT

(71) Applicant: KYOCERA CORPORATION, Kyoto (JP)

(72) Inventor: Kaoru Kusafuka, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 270 days.

(21) Appl. No.: 17/615,035

(22) PCT Filed: May 29, 2020

(86) PCT No.: PCT/JP2020/021457
§ 371 (c)(1),
(2) Date: Nov. 29, 2021

(87) PCT Pub. No.: WO2020/241870
PCT Pub. Date: Dec. 3, 2020

(65) Prior Publication Data
US 2022/0224879 A1    Jul. 14, 2022

(30) Foreign Application Priority Data
May 30, 2019 (JP) .................... 2019-101569

(51) Int. Cl.
*H04N 13/32*     (2018.01)
*G02B 27/01*     (2006.01)
(Continued)

(52) U.S. Cl.
CPC ....... *H04N 13/398* (2018.05); *G02B 27/0101* (2013.01); *G02B 30/30* (2020.01);
(Continued)

(58) Field of Classification Search
CPC ............. H04N 13/32; H04N 13/383; H04N 2213/001; H04N 13/366; H04N 13/315;
(Continued)

(56) References Cited

U.S. PATENT DOCUMENTS

| | | | | |
|---|---|---|---|---|
| 6,970,290 B1 * | 11/2005 | Mashitani | ............ | H04N 13/376 348/E13.043 |
| 8,373,617 B2 * | 2/2013 | Kim | ............ | H04N 13/31 345/6 |
| 9,019,357 B2 * | 4/2015 | Fu | ............ | H04N 13/398 348/51 |
| 9,363,504 B2 * | 6/2016 | Cha | ............ | H04N 13/359 |

(Continued)

FOREIGN PATENT DOCUMENTS

| | | |
|---|---|---|
| EP | 3554069 A1 | 10/2019 |
| JP | 2001166259 A | 6/2001 |

(Continued)

*Primary Examiner* — Alazar Tilahun
(74) *Attorney, Agent, or Firm* — HAUPTMAN HAM, LLP

(57) ABSTRACT

A three-dimensional display device includes a display panel, a shutter panel, an obtainer, and a controller. The display panel includes a plurality of subpixels that display a parallax image. The parallax image includes a first image and a second image having parallax between the images. The shutter panel defines a ray direction of image light from the parallax image. The image light is emitted from the display panel. The obtainer obtains an ambient illuminance level around an image viewed by a user. The controller determines a pupil diameter of the user based on the ambient illuminance level. The controller controls at least one of the display panel or the shutter panel based on the pupil diameter.

12 Claims, 11 Drawing Sheets

(51) Int. Cl.
*G02B 30/20* (2020.01)
*G02B 30/30* (2020.01)
*H04N 13/398* (2018.01)

(52) U.S. Cl.
CPC ..... *H04N 13/32* (2018.05); *G02B 2027/0134* (2013.01); *G02B 2027/0141* (2013.01)

(58) Field of Classification Search
CPC .. H04N 13/371; H04N 13/344; H04N 13/349; G02B 2027/0136; G02B 27/0101; G02B 30/24; G02B 27/0179; G02B 27/017; G02B 27/01; G02B 27/02; G02B 2027/0134; G02B 2027/0138; G02B 2027/0141; G02B 2027/014; G02B 2027/0127; G02B 2027/0129; G09G 2300/023; G09G 2360/144; G09G 3/003; G03B 35/24; G06F 3/013; G06F 3/012; G06F 3/011
See application file for complete search history.

(56) References Cited

U.S. PATENT DOCUMENTS

| | | | |
|---|---|---|---|
| 2009/0279025 A1* | 11/2009 | Machidori | B60K 35/00 349/110 |
| 2011/0006979 A1* | 1/2011 | Min | G09G 3/003 345/102 |
| 2011/0242150 A1* | 10/2011 | Song | H04N 13/366 345/697 |
| 2011/0316989 A1* | 12/2011 | Imai | H04N 13/324 348/51 |
| 2013/0093861 A1 | 4/2013 | Itoh | |
| 2016/0125814 A1 | 5/2016 | Sumi | |
| 2016/0249046 A1* | 8/2016 | Yang | H04N 13/398 |
| 2016/0267875 A1* | 9/2016 | Weindorf | G06V 20/59 |
| 2016/0327791 A1* | 11/2016 | Kasano | B60K 35/00 |

FOREIGN PATENT DOCUMENTS

| | | |
|---|---|---|
| JP | 2016170415 A | 9/2016 |
| JP | 201915823 A | 1/2019 |
| WO | 2012147328 A1 | 11/2012 |

* cited by examiner

THREE-DIMENSIONAL DISPLAY DEVICE, HEAD-UP DISPLAY SYSTEM, AND MOVABLE OBJECT

RELATED APPLICATIONS

The present application is a National Phase of International Application Number PCT/JP2020/021457, filed May 29, 2020, which claims priority to Japanese Application No. 2019-101569, filed May 30, 2019.

FIELD

The present disclosure relates to a three-dimensional (3D) display device, a head-up display system, and a movable object.

BACKGROUND

A known technique is described in, for example, Patent Literature 1.

CITATION LIST

Patent Literature

Patent Literature 1: Japanese Unexamined Patent Application Publication No. 2001-166259

BRIEF SUMMARY

A three-dimensional display device according to an aspect of the present disclosure includes a display panel, a shutter panel, an obtainer, and a controller. The display panel includes a plurality of subpixels that display a parallax image. The parallax image includes a first image and a second image having parallax between the images. The shutter panel defines a ray direction of image light from the parallax image. The image light is emitted from the display panel. The obtainer obtains an ambient illuminance level around an image viewed by a user. The controller determines a pupil diameter of the user based on the ambient illuminance level. The controller controls at least one of the display panel or the shutter panel based on the pupil diameter.

A head-up display system according to an aspect of the present disclosure includes a three-dimensional display device. The three-dimensional display device includes a display panel, a shutter panel, an obtainer, and a controller. The display panel includes a plurality of subpixels that display a parallax image. The parallax image includes a first image and a second image having parallax between the images. The shutter panel defines a ray direction of image light from the parallax image. The image light is emitted from the display panel. The obtainer obtains an ambient illuminance level around an image viewed by a user. The controller determines a pupil diameter of the user based on the ambient illuminance level. The controller controls at least one of the display panel or the shutter panel based on the pupil diameter.

A movable object according to an aspect of the present disclosure includes a head-up display system. The head-up display system includes a three-dimensional display device. The three-dimensional display device includes a display panel, a shutter panel, an obtainer, and a controller. The display panel includes a plurality of subpixels that display a parallax image. The parallax image includes a first image and a second image having parallax between the images. The shutter panel defines a ray direction of image light from the parallax image. The image light is emitted from the display panel. The obtainer obtains an ambient illuminance level around an image viewed by a user. The controller determines a pupil diameter of the user based on the ambient illuminance level. The controller controls at least one of the display panel or the shutter panel based on the pupil diameter.

BRIEF DESCRIPTION OF DRAWINGS

The objects, features, and advantages of the present disclosure will become more apparent from the following detailed description and the drawings.

DETAILED DESCRIPTION

First Embodiment

A first embodiment of the present disclosure will now be described with reference to the drawings. The drawings used herein are schematic and are not drawn to scale relative to the actual size of each component.

A three-dimensional (3D) display system with the structure that forms the basis of a 3D display system according to one or more embodiments of the present disclosure will first be described.

A known 3D display device for enabling glasses-free 3D image viewing includes an optical element that directs a part of image light from a display panel to reach a right eye and another part of the image light to reach a left eye. However, the inventor and others have noticed that crosstalk may increase as an ambient illuminance level around an image viewed by the user decreases and may disable the user from properly viewing a 3D image appearing on the display panel. One or more aspects of the present disclosure are directed to a 3D display device, a head-up display system, and a movable object that allow a user to properly view a 3D image independently of changes in the ambient illuminance level around an image viewed by the user.

Figure 1:
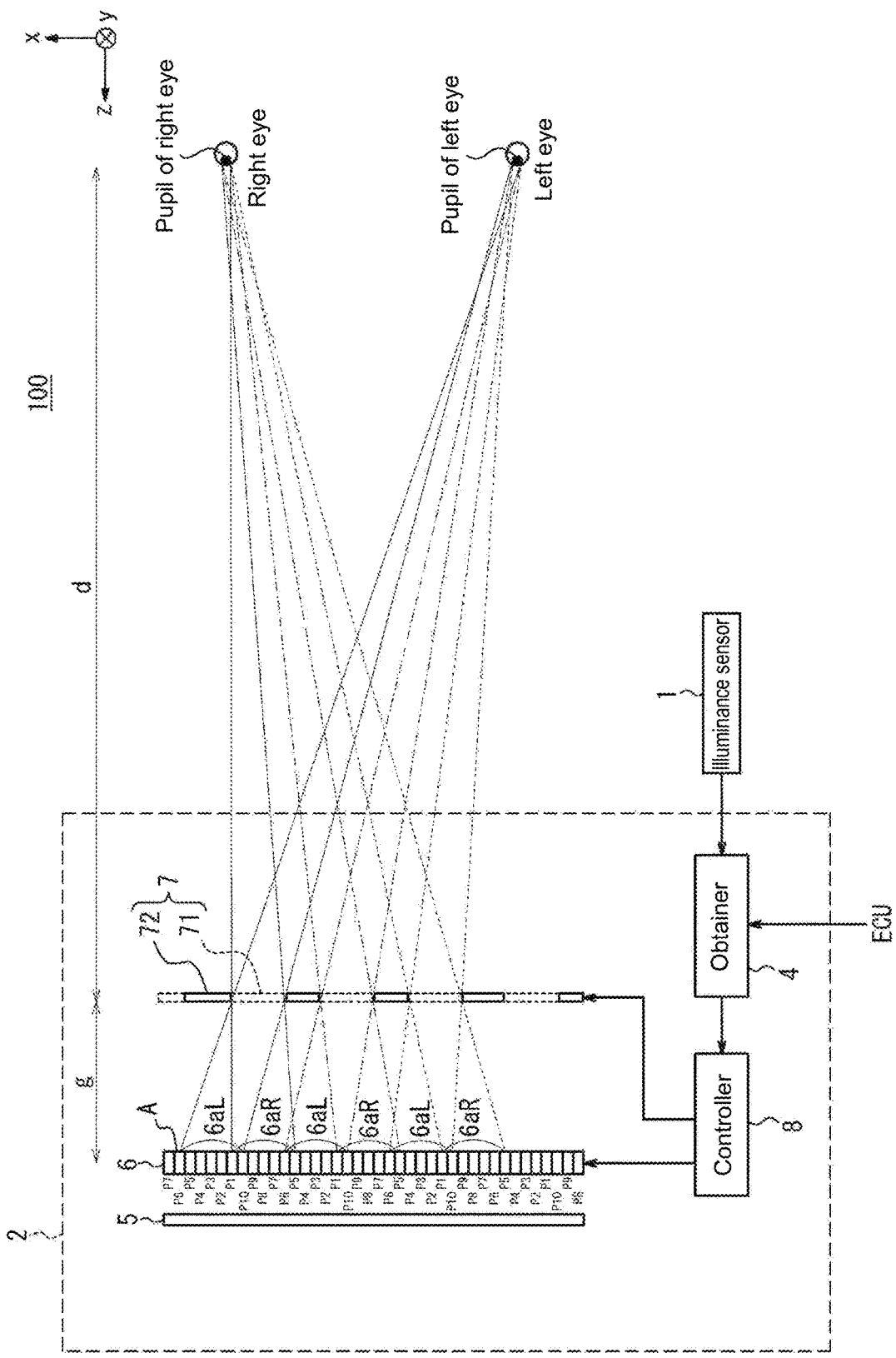
FIG. 1 is a diagram of a 3D display system according to a first embodiment of the present disclosure viewed in a vertical direction.

As shown in FIG. 1, a 3D display system 100 according to a first embodiment of the present disclosure includes an illuminance sensor 1 and a 3D display device 2.

The illuminance sensor 1 may detect the ambient illuminance level around an image viewed by a user. For example, the illuminance sensor 1 may detect the ambient illuminance level around the user. The illuminance sensor 1 may output the detected illuminance level to the 3D display device 2. The illuminance sensor 1 may include a photodiode or a phototransistor.

The 3D display device 2 includes an obtainer 4, an illuminator 5, a display panel 6, a shutter panel 7, and a controller 8.

The obtainer 4 may obtain the illuminance level detected by the illuminance sensor 1. The 3D display device 2 may include the illuminance sensor 1. In this case, the obtainer 4 may obtain the illuminance level detected by the illuminance sensor 1 included in the 3D display device 2. The obtainer 4 may obtain an illuminance level from any device that includes the illuminance sensor 1. For example, when the 3D display device 2 is mounted on a movable object 300, the headlights of the movable object 300 may be controlled to turn on or off in accordance with ambient brightness. In this case, the obtainer 4 may obtain the illuminance level detected by an illuminance sensor installed in the movable object 300 from an electronic control unit (ECU) that controls the headlights of the movable object 300. The obtainer 4 may obtain lighting information about the headlights instead of the illuminance level.

The movable object according to one or more embodiments of the present disclosure includes a vehicle, a vessel, or an aircraft. The vehicle according to one or more embodiments of the present disclosure includes, but is not limited to, an automobile or an industrial vehicle, and may also include a railroad vehicle, a community vehicle, or a fixed-wing aircraft traveling on a runway. The automobile includes, but is not limited to, a passenger vehicle, a truck, a bus, a motorcycle, or a trolley bus, and may also include another vehicle traveling on a road. The industrial vehicle includes an agricultural vehicle or a construction vehicle. The industrial vehicle includes, but is not limited to, a forklift or a golf cart. The agricultural vehicle includes, but is not limited to, a tractor, a cultivator, a transplanter, a binder, a combine, or a lawn mower. The construction vehicle includes, but is not limited to, a bulldozer, a scraper, a power shovel, a crane vehicle, a dump truck, or a road roller. The vehicle includes a man-powered vehicle. The classification of the vehicle is not limited to the above. For example, the automobile may include an industrial vehicle traveling on a road, and one type of vehicle may fall within a plurality of classes. The vessel according to one or more embodiments of the present disclosure includes a jet ski, a boat, or a tanker. The aircraft according to one or more embodiments of the present disclosure includes a fixed-wing aircraft or a rotary-wing aircraft.

The illuminator 5 may illuminate a surface of the display panel 6. The illuminator 5 may include, for example, a light source, a light guide plate, a diffuser plate, and a diffusion sheet. The illuminator 5 emits illumination light from the light source and spreads the illumination light uniformly toward the surface of the display panel 6 using its components such as the light guide plate, the diffuser plate, and the diffusion sheet. The illuminator 5 may emit the uniform light toward the display panel 6.

Figure 2:
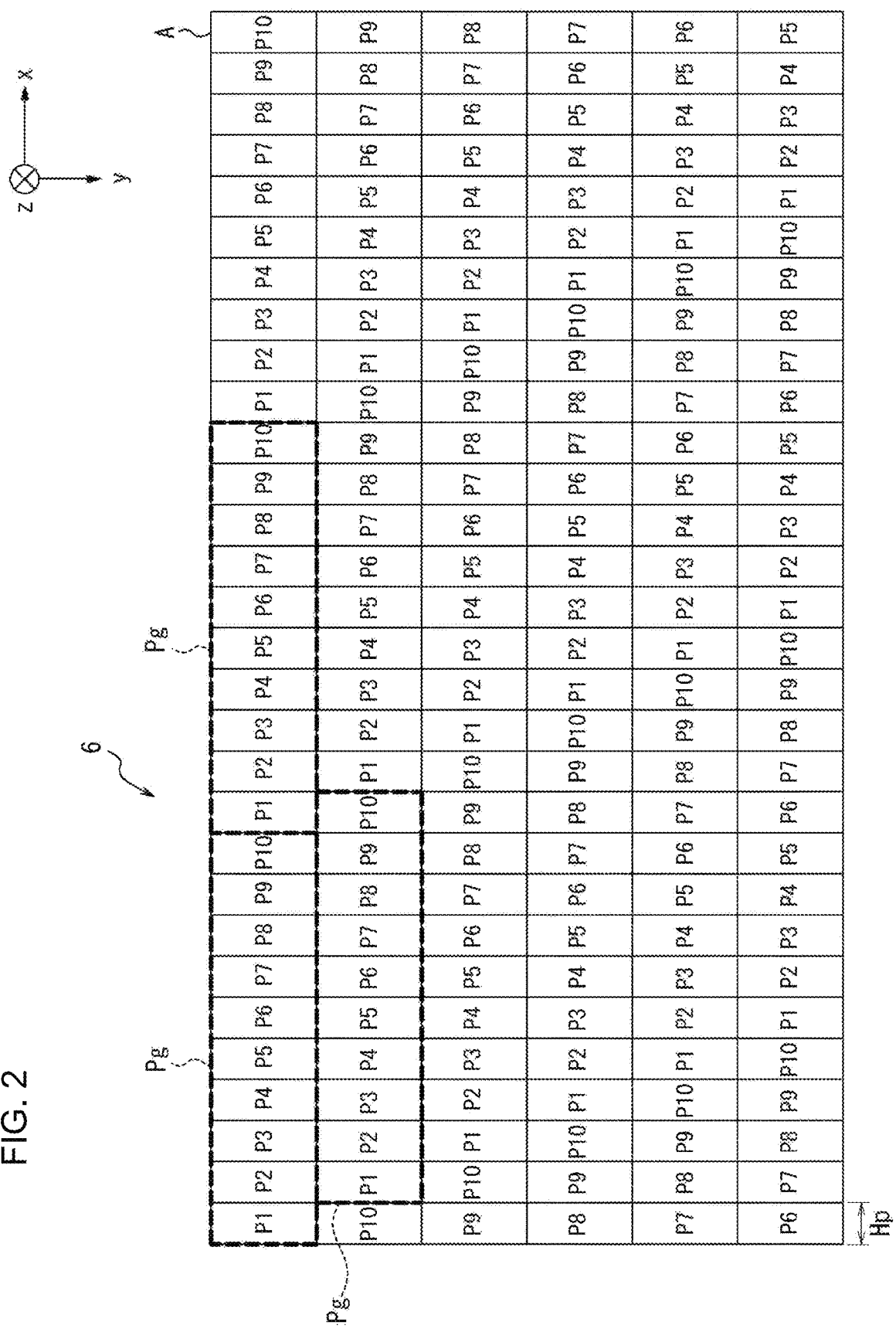
FIG. 2 is a diagram of a display panel shown in FIG. 1 viewed in a depth direction.

The display panel 6 may be, for example, a transmissive liquid crystal display panel. The display panel 6 is not limited to a transmissive liquid crystal display panel but may be another display panel such as an organic electroluminescent (EL) display. When the display panel 6 is self-luminous, the 3D display device 2 may eliminate the illuminator 5. The display panel 6 that is a liquid crystal panel will now be described. As shown in FIG. 2, the display panel 6 includes a two-dimensional active area A including multiple divisional areas. The active area A displays a parallax image. The parallax image includes a left-eye image (first image) and a right-eye image (second image) having parallax with the left-eye image. The left-eye image is viewable with the left eye (first eye) of the user. The right-eye image is viewable with the right eye (second eye) of the user. The divisional areas are defined in a grid-like black matrix in a first direction and in a second direction perpendicular to the first direction. The direction perpendicular to the first and second directions is referred to as a third direction. In the present embodiment, the first direction is defined as the horizontal direction. The second direction is defined as the vertical direction. The third direction is defined as the depth direction. However, the first, second, and third directions are not limited to the directions referred to above. In the drawings, the first direction is written as x-direction, the second direction as y-direction, and the third direction as z-direction.

Each divisional area corresponds to a subpixel. Thus, the active area A includes multiple subpixels arranged in a grid in the horizontal and vertical directions.

Each subpixel may correspond to one of red (R), green (G), and blue (B). A set of three subpixels colored R, G, and B may form a pixel. A pixel may be referred to as a picture element. For example, multiple subpixels forming individual pixels are arranged in the horizontal direction. The vertical direction is perpendicular to the horizontal direction on the surface of the display panel 6.

As described above, multiple subpixels arranged in the active area A form subpixel groups Pg. Each subpixel group Pg includes a predetermined number of subpixels in the horizontal and vertical directions. Each subpixel group Pg includes (2×n×b) subpixels P1 to P(2×n×b), which are consecutively arranged in b row(s) in the vertical direction and in 2×n columns in the horizontal direction. In the example shown in FIG. 2, the subpixel groups Pg are repeatedly arranged in the horizontal direction. The subpixel groups Pg are repeatedly arranged in the vertical direction at positions shifted by one subpixel in the horizontal direction from the corresponding subpixels. In the present embodiment, n=5 and b=1 are satisfied, for example. As shown in FIG. 2, the active area A includes the subpixel groups Pg each including ten consecutive subpixels P1 to P10 arranged in one row in the vertical direction and in ten columns in the horizontal direction. Each of symbols P1 to P10 is identification information for the corresponding subpixel. In FIG. 2, some of the subpixel groups Pg are denoted by reference signs.

Each subpixel group Pg is the smallest unit controllable by the controller 8 (described later) to display an image for each of right and left eyes. The subpixels P1 to P(2×n×b) included in each subpixel group Pg with the same identification information are controlled by the controller 8 at the same time. For example, the controller 8 switches the image to be displayed by the subpixels P1 from the left-eye image to the right-eye image or to a black image (described later) at the same time in all the subpixel groups Pg.

As shown in FIG. 1, the shutter panel 7 is planar along the active area A and arranged at a predetermined distance (gap) g from the active area A. The shutter panel 7 may be located opposite to the illuminator 5 from the display panel 6. The shutter panel 7 may be located between the display panel 6 and the illuminator 5.

Figure 3:
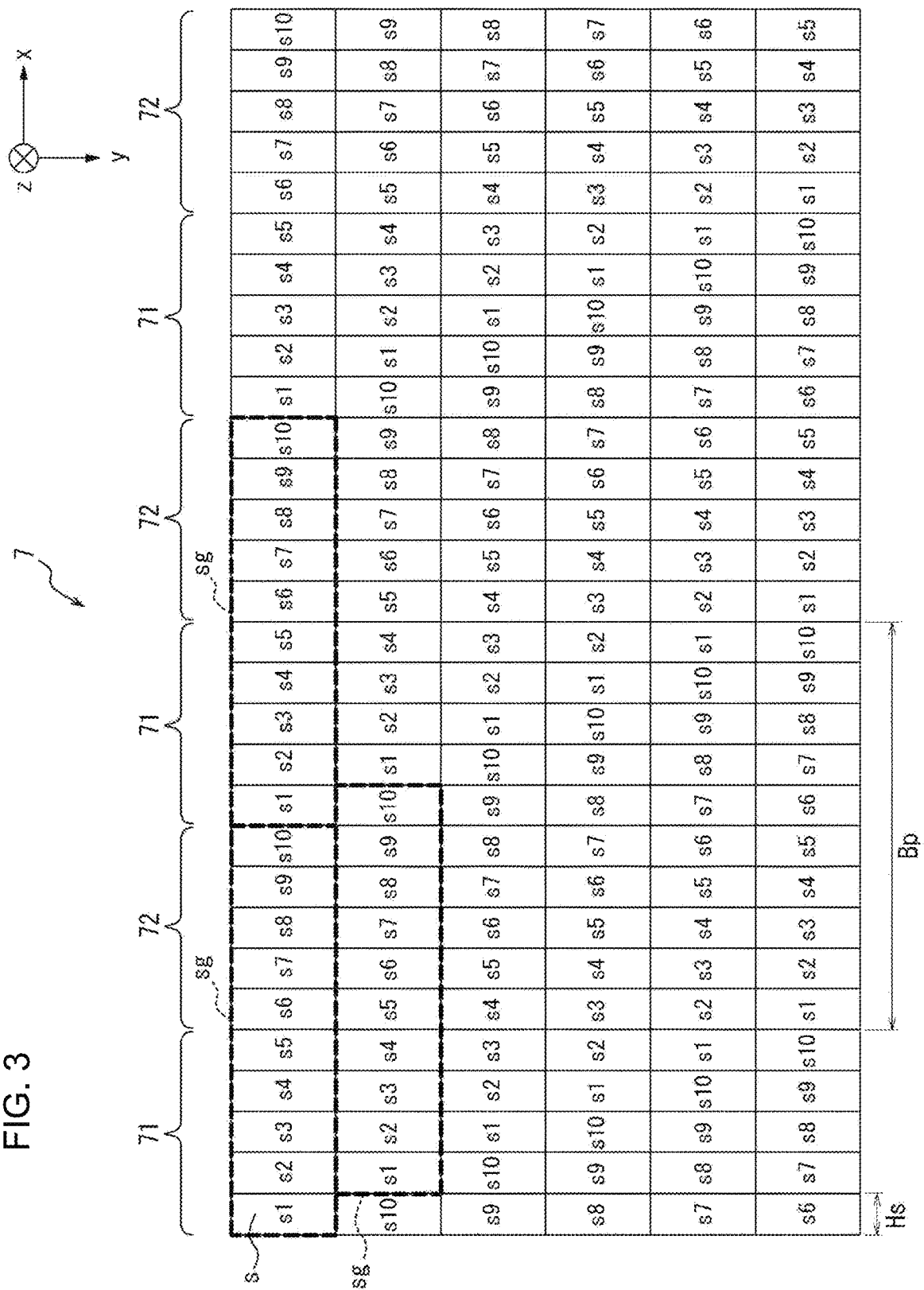
FIG. 3 is a diagram of a shutter panel shown in FIG. 1 viewed in the depth direction.

The shutter panel 7 includes a liquid crystal shutter. As shown in FIG. 3, the shutter panel 7 includes multiple shutter cells s arranged in a grid in the horizontal and vertical directions. Each shutter cell s has the same horizontal length Hs and the same vertical length. The shutter cells s included in the shutter panel 7 form shutter cell groups sg. Each shutter cell group sg includes a predetermined number of shutter cell groups in the horizontal and vertical directions. More specifically, each shutter cell group sg includes (2×n× b) shutter cell s1 to s(2×n×b), which are consecutively arranged in b row(s) in the vertical direction and 2×n columns in the horizontal direction. The shutter cell sg groups are arranged to correspond to the arrangement of the subpixels in the subpixel groups Pg. The shutter cell groups sg are repeatedly arranged in the horizontal direction. The shutter cell groups sg are repeatedly arranged in the vertical direction at positions shifted by one shutter cell in the horizontal direction from the corresponding shutter cells.

When n=5 and b=1 as described above, each shutter cell group sg includes ten consecutive shutter cells s1 to s10 arranged in one row in the vertical direction and in ten columns in the horizontal direction. In FIG. 3, some of the shutter cell groups sg are denoted by reference signs. Each shutter cell group sg may include (2×n'×b') shutter cells s1 to s(2×n'×b'), which are consecutively arranged in b' (b'≠b) row(s) in the vertical direction and in 2×(n'≠n) columns in the horizontal direction.

Each shutter cell s has a light transmittance controllable by the controller 8 in accordance with a change in the voltage applied to the shutter cell s. The controller 8 controls selected ones of the multiple shutter cells s into a light transmissive state and the remaining shutter cells s into a light attenuating state. Thus, as shown in FIGS. 1 and 3, the shutter panel 7 can have areas in the light transmissive state that serve as transmissive areas 71 and the remaining areas in the light attenuating state that serve as attenuating areas 72. The transmissive areas 71 may transmit light with a transmittance of a first predetermined value or greater. The first predetermined value is greater than a second predetermined value (described later). The attenuating areas 72 may transmit light with a transmittance of the second predetermined value or less. For example, the attenuating areas 72 block light incident on the shutter panel 7 and transmit substantially no light. The ratio of the second predetermined value to the first predetermined value is to be minimized. The ratio of the second predetermined value to the first predetermined value may be 1/100 in one example. The ratio of the second predetermined value to the first predetermined value may be 1/1000 in another example.

Thus, as shown in FIG. 1, the shutter panel 7 defines a ray direction that is the traveling direction of image light emitted from the subpixels Image light emitted from some subpixels in the active area A passes through the transmissive areas 71 to reach the pupil of the left eye of the user. Image light emitted from the other subpixels in the active area A passes through the transmissive areas 71 to reach the pupil of the right eye of the user.

Figure 4:
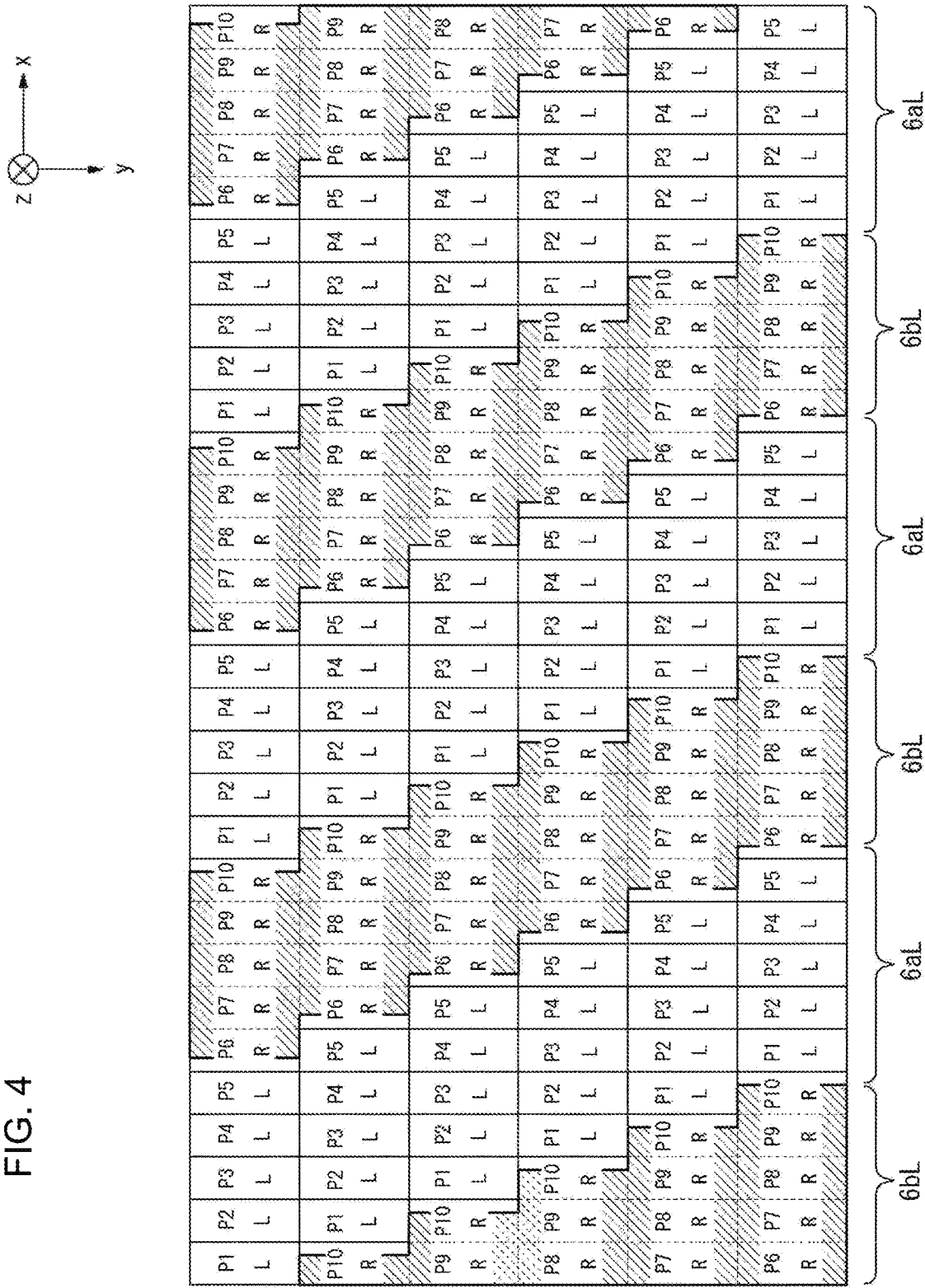
FIG. 4 is a diagram describing subpixels viewable with a left eye.

Referring to FIG. 4, left viewable sections 6aL (first viewable sections) are defined in the active area A and viewable with the user's left eye when image light from some of the subpixels passes through the transmissive areas 71 on the shutter panel 7 and reaches the pupil of the user's left eye. Left attenuation sections 6bL are less viewable with the user's left eye when the image light is attenuated by the attenuating areas 72 on the shutter panel 7.

Figure 5:
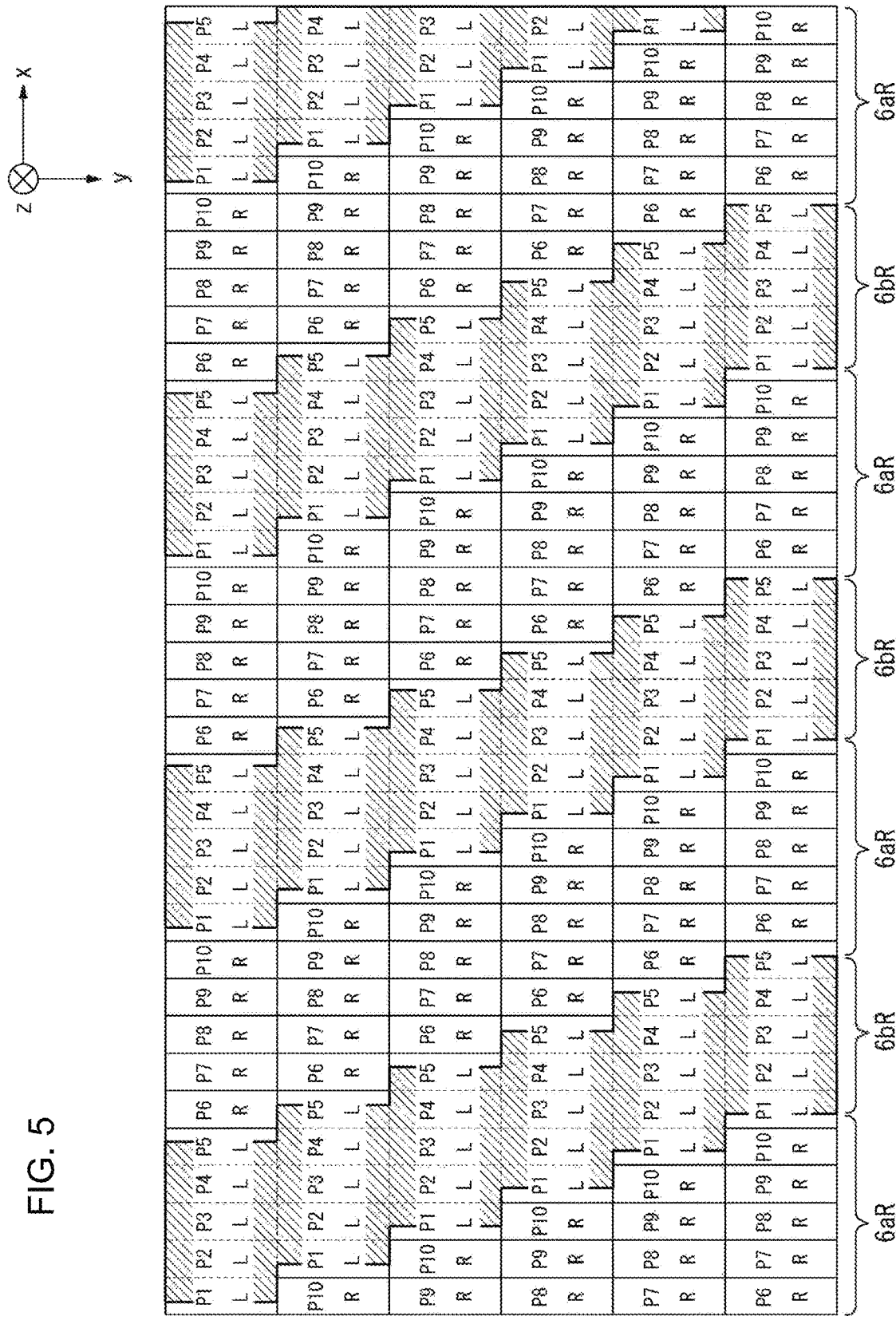
FIG. 5 is a diagram describing subpixels viewable with a right eye.

Right viewable sections 6aR (second viewable sections) in FIG. 5 are defined in the active area A and viewable by the user's right eye when image light from the other subpixels passes through the transmissive areas 71 on the shutter panel 7 and reaches the pupil of the user's right eye. Right attenuation sections 6bR are less viewable by the user's right eye when the image light is attenuated by the attenuating areas 72 on the shutter panel 7.

In the example described above, the left-eye image is the first image, the right-eye image is the second image, the left eye is the first eye, the right eye is the second eye, the left viewable sections 6aL are the first viewable sections, and the right viewable sections 6aR are the second viewable sections. However, the structure is not limited to the above example. The left-eye image may be the second image, and the right-eye image may be the first image. In this case, the left eye is the second eye, the right eye is the first eye, the left viewable sections 6aL are the second viewable sections, and the right viewable sections 6aR are the first viewable sections. In the examples described below, the left eye and the left viewable sections are mainly used to describe the control, but the same applies to the control based on the right eye and the right viewable sections.

Figure 6:
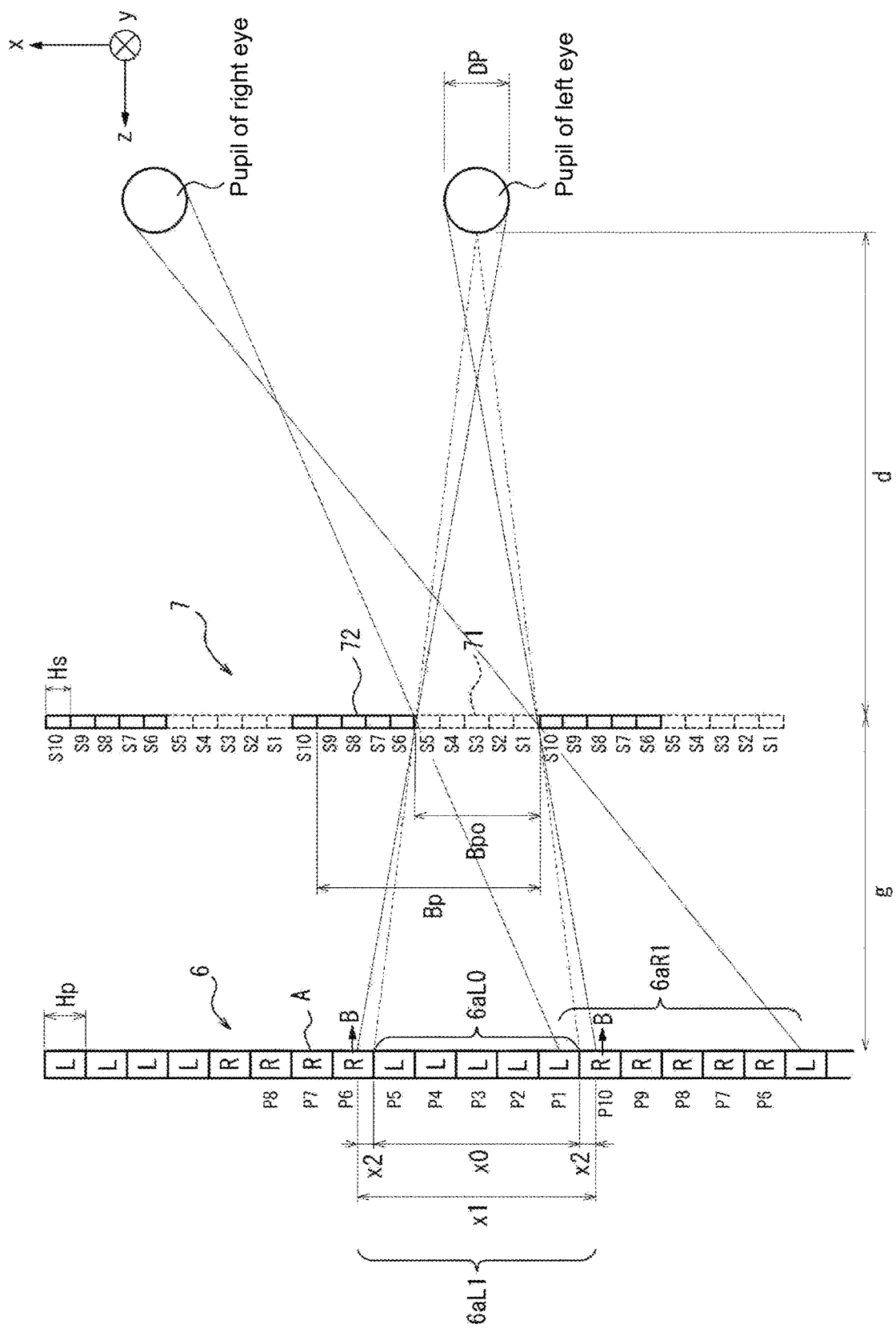
FIG. 6 is diagram describing the relationship between a pupil diameter and a viewable section and an image viewed by a user under control in a first example.
Figure 7:
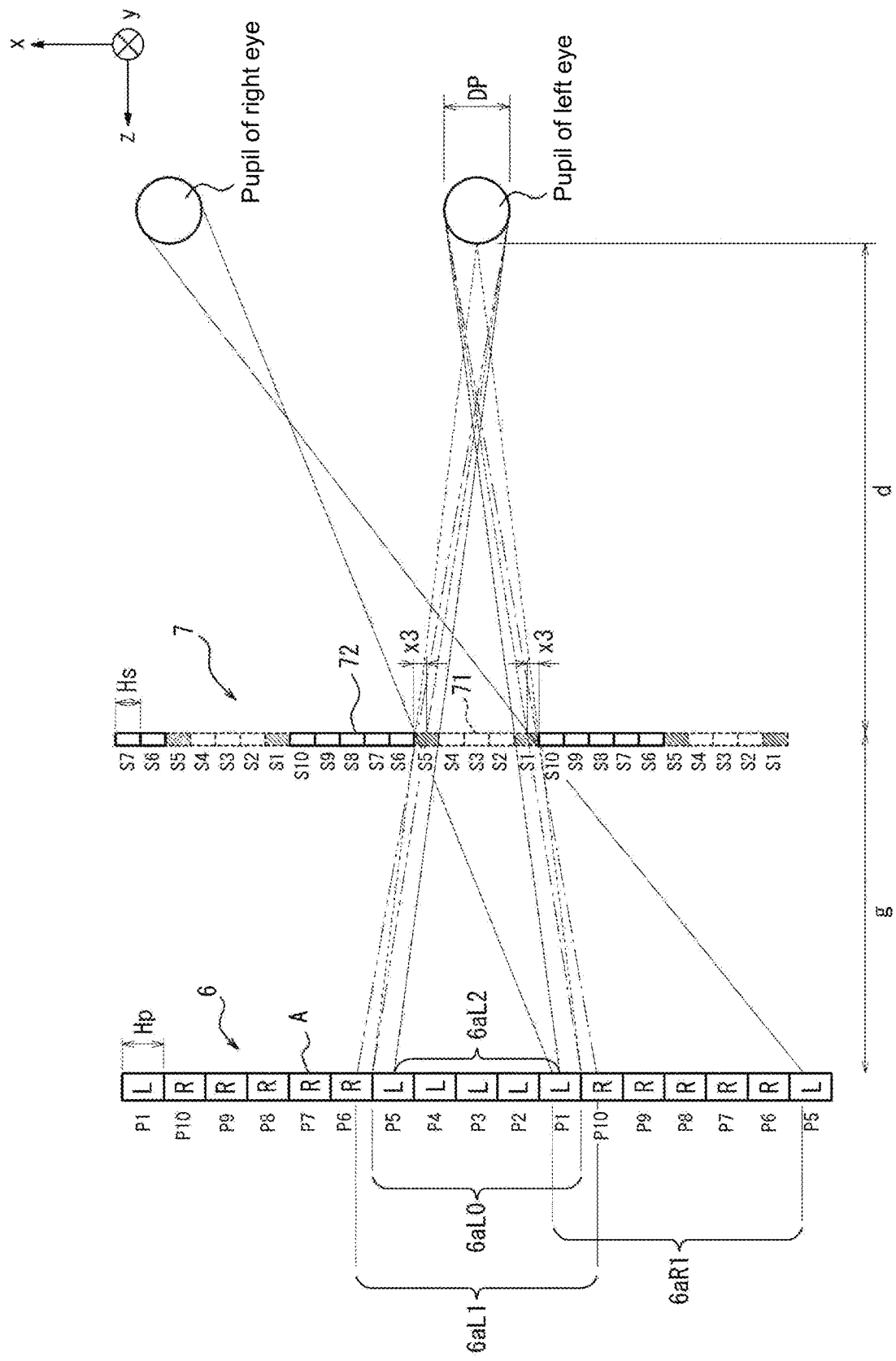
FIG. 7 is a diagram describing an image viewed by a user under control in a second example.
Figure 8:
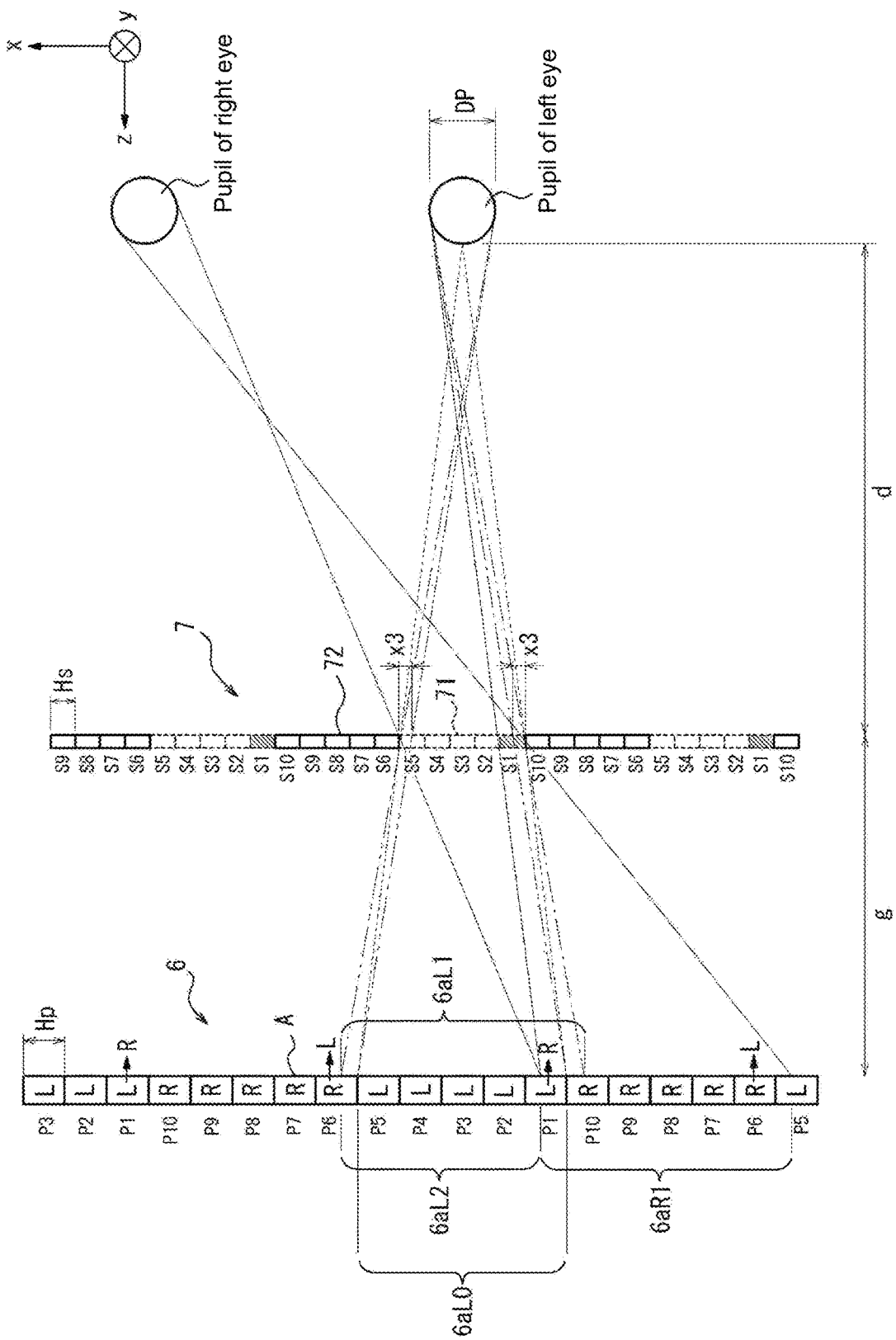
FIG. 8 is a diagram describing an image viewed by a user under control in a third example.

Referring to FIG. 6, a reference state of the 3D display device 2 will now be described. FIG. 6 shows, in detail, the pupil of the left eye, the display panel 6, and the shutter panel 7 shown in FIG. 1. For ease of understanding, FIG. 6 uses a scale different from the scale in FIG. 1. In FIGS. 6 to 8, the multiple shutter cells s include shutter cells s controlled in the light transmissive state indicated by broken lines and shutter cells s controlled in the light attenuating state indicated by solid lines.

In the reference state, the display panel 6 and the shutter panel 7 are controlled to have the area of the right-eye image included in the left viewable sections and the area of the left-eye image included in the right viewable sections each being less than or equal to a threshold when the pupil diameter is hypothetically zero. In the example in FIG. 6, the threshold is zero, and the shutter panel 7 has an aperture ratio of 50% in the reference state. More specifically, sets of consecutive shutter cells s (shutter cells s1 to s5) are controlled in the light transmissive state, and the remaining sets of consecutive shutter cells s (shutter cells s6 to s10) are controlled in the light attenuating state. In the reference state, the display panel 6 displays the left-eye image to cause left viewable sections 6aL0 defined when the pupil diameter is hypothetically zero to include subpixels displaying the left-eye image alone. In the reference state, the display panel 6 displays the right-eye image to cause right viewable sections 6aR0 defined when the pupil diameter is hypothetically zero to include subpixels displaying the right-eye image alone.

In the reference state, the horizontal length x0 of each left viewable section 6aL0 is determined with Formula 1 below, where Bpo is a transmissive area length, g is the gap, and d is a proper viewing distance. The transmissive area length Bpo is the horizontal length of each transmissive area 71. The proper viewing distance d is the distance between the shutter panel 7 and the eyes of the user.

$$x0 = Bpo\left(1 + \frac{g}{d}\right) \quad (1)$$

In actual use, the user views image light not at a point but on a finite area in the pupil of each eye. The relationship between the illuminance level, the pupil diameter DP of the left eye, and the left viewable sections 6aL will now be described. As shown in FIG. 6, the horizontal length x of each left viewable section 6aL is determined with Formula 2 below, where Bpo is the transmissive area length, g is the gap, d is the proper viewing distance, and DP is the pupil diameter.

$$x1 = Bpo\left(1 + \frac{g}{d}\right) + \frac{g \times DP}{d} \qquad (2)$$

The pupil diameter DP increases as the ambient illuminance level decreases. As represented by Formula 2, the horizontal length x1 of each left viewable section increases as the pupil diameter DP increases. Thus, the horizontal length x1 of the left viewable section increases as the ambient illuminance level decreases.

When the display panel 6 and the shutter panel 7 are in the reference state with the pupil diameter being hypothetically zero, each left eye viewable section 6aL includes subpixels displaying the left-eye image alone. When the display panel 6 and the shutter panel 7 are in the reference state with the pupil diameter DP being finite, the left eye viewable section includes the subpixels displaying the right-eye image in addition to the subpixels displaying the left-eye image. For example, as shown in FIGS. 4 and 6, each left viewable section 6aL includes the full area of each of the subpixels P1 to P5 and a partial area of each of the subpixels P6 and P10. Similarly, when the 3D display device 2 is in the reference state with the pupil diameter being hypothetically zero, each right eye viewable section includes subpixels displaying the right-eye image alone. With the pupil diameter DP being finite, the right eye viewable section includes the subpixels displaying the left-eye image in addition to the subpixels displaying the right-eye image. As shown in FIGS. 5 and 6, each right viewable section 6aR includes the full area of each of the subpixels P6 to P10 and a partial area of each of the subpixels P1 and P5.

In this case, the user views the left-eye image and a part of the right-eye image with the left eye and views the right-eye image and a part of the left-eye image with the right eye. In FIGS. 4, 5, and 6 and subsequent figures, subpixels L display the left-eye image, and subpixels R display the right-eye image. As described above, the right-eye image and the left-eye image having parallax with each other allow the user to view a 3D image. However, the user views a part of the right-eye image with the left eye and a part of the left eye mage with the right eye, with crosstalk being generated.

The controller 8 may be connected to the components of the 3D display device 2 to control these components. The components controlled by the controller 8 include the display panel 6 and the shutter panel 7. The controller 8 may be, for example, a processor. The controller 8 may include one or more processors. The processors may include a general-purpose processor that reads a specific program to perform a specific function, and a processor dedicated to specific processing. The dedicated processor may include an application-specific integrated circuit (ASIC). The processor may include a programmable logic device (PLD). The PLD may include a field-programmable gate array (FPGA). The controller 8 may be either a system on a chip (SoC) or a system in a package (SiP) in which one or more processors cooperate with other components. The controller 8 may include a storage to store various items of information or programs to operate each component of the 3D display system 100. The storage may be, for example, a semiconductor memory. The storage may serve as a work memory for the controller 8.

The controller 8 performs control to reduce the crosstalk described above. At the start of the control, the 3D display device 2 is in the reference state.

First Example

In a first example described below with reference to FIG. 6, the controller 8 determines the left viewable sections 6aL and the right viewable sections 6aR based on the pupil diameter DP. More specifically, the controller 8 determines, among subpixels P displaying the right-eye image, any subpixel P having a part included in a left viewable section 6aL at a ratio higher than a first ratio after the pupil diameter DP changes. The controller 8 changes the right-eye image displayed by the determined subpixel to a black image. The black image has a luminance level lower than a predetermined value (e.g., a luminance level of 10 out of 256 shades) close to the lowest luminance level. The first example will be described in more detail below.

In response to the obtainer 4 obtaining the illuminance level, the controller 8 first determines the pupil diameter DP based on the illuminance level. For example, the controller 8 may determine the pupil diameter DP through computation based on the illuminance level. For example, the controller 8 may determine the pupil diameter DP using a table associating the illuminance level and the pupil diameter DP.

The controller 8 determines left viewable sections 6aL1 and right viewable sections 6aR1 based on the pupil diameter DP. For example, the controller 8 may determine the left viewable sections 6aL1 and the right viewable sections 6aR1 using Formula 2 described above and the positions of the pupils in the horizontal direction. The controller 8 may determine the left viewable sections 6aL1 and the right viewable sections 6aR1 using the horizontal positions of the pupils and a table that includes pupil diameters DP and the right and left viewable sections 6aR1 and 6aL1 in a manner associated with each other. The table is pre-generated using the relationship indicated by Formula 2.

The controller 8 may determine any subpixel P displaying the right-eye image but at least partly included in a left viewable section 6aL1. In the example shown in FIG. 6, the controller 8 determines that the subpixels P6 and P10 displaying the right-eye image are at least partly included in the left viewable section 6aL1.

The controller 8 calculates the horizontal length x2 of the part of each subpixel P displaying the right-eye image but at least partly included in the left viewable section 6aL1. The length x2 can be calculated using Formula 3.

$$x2 = \frac{(x1 - x0)}{2} = \frac{g \times DP}{2 \times d} \qquad (3)$$

The controller 8 may calculate the ratio of the length x2 to the horizontal length Hp of the subpixel P (opposite image content ratio r1). The opposite image content ratio r1 may be calculated using Formula 4.

$$r1 = \frac{x2}{Hp} = \frac{g \times DP}{2 \times d \times Hp} \qquad (4)$$

The controller 8 may determine whether the opposite image content ratio r1 is higher than the first ratio. Upon determining that the opposite image content ratio r1 is lower than or equal to the first ratio, the controller 8 allows the subpixel P displaying the right-eye image but at least partly included in the left viewable section 6aL1 to continue to display the right-eye image. Upon determining that the opposite image content ratio r1 is higher than the first ratio, the controller 8 causes the subpixel P displaying the right-eye image but at least partly included in the left viewable section 6aL1 to display the black image. In FIG. 6, the subpixels B display the black image.

The first ratio may be determined as appropriate based on the degree of crosstalk and the amount of image light. At a higher first ratio, the amount of image light decreases but crosstalk can be reduced. At a lower first ratio, crosstalk increases but the amount of image light can be increased.

The 3D display device 2 in the first example decreases the area of the right-eye image for the right eye viewable with the user's left eye and the area of the left-eye image for the left eye viewable with the user's right eye, thus reducing crosstalk. In this state, the amount of image light reaching the pupil of each eye of the user decreases. Under such control, the illuminance level around the user's eyes is lower than the illuminance level in the reference state. However, the user can view an image with less light at a lower illuminance level around the user's eyes. The user can thus properly view the 3D image with less image light reaching the pupils.

Second Example

In a second example described below with reference to FIG. 7, the controller 8 determines the pupil diameter DP of the user based on the illuminance level and controls the shutter panel 7 based on the pupil diameter. More specifically, the controller 8 determines, based on the pupil diameter DP, any shutter cell s, among the shutter cells s controlled in the light transmissive state, having a part receiving image light from the right-eye image toward the pupil of the user's left eye at a ratio higher than a second ratio after the pupil diameter DP changes. The controller 8 controls the determined shutter cell s into the light attenuating state. The second example will be described in more detail below.

In response to the obtainer 4 obtaining an illuminance level, the controller 8 may first determine the pupil diameter DP based on the illuminance level. The controller 8 specifically determines the pupil diameter DP in the same manner as in the first example.

The controller 8 may determine, based on the pupil diameter DP, any shutter cell s (first shutter cell sa), among the shutter cells s controlled in the light transmissive state in the reference state, receiving the image light from the right-eye image toward the pupil of the left eye. In the example in FIG. 7, image light from a part of the right-eye image displayed by the subpixel P10 travels toward the pupil of the left eye between two dot-and-dash lines to reach a part of the shutter cell s1. The image light from a part of the right-eye image displayed by the subpixel P6 travels toward the pupil of the left eye between two two-dot chain lines to reach the shutter cell s5. Thus, the controller 8 determines, among the shutter cells s1 to s5 controlled in the light transmissive state, the shutter cells s1 and s5 as the first shutter cells sa.

In FIG. 7, the shutter cells s1 and s5 as the first shutter cells sa are hatched. The viewable section 6aL0 is the viewable section 6aL when the pupil of the eye is hypothetically a point (more specifically, when the pupil diameter DP is zero). The viewable section 6aL1 is the viewable section 6aL when the pupil diameter DP of the eye is finite and the 3D display device 2 is in the reference state. A viewable section 6aL2 is the viewable section 6aL when the pupil diameter DP of the eye is finite and the controller 8 controls the shutter panel 7 based on the pupil diameter in the manner described in this example.

The controller 8 may calculate a horizontal length x3 of the part of each first shutter cell sa transmitting image light from the right-eye image. The controller 8 may calculate the ratio of the length x3 to the horizontal length Hs of the shutter cell s (opposite image reaching ratio r2, r2=x3/Hs). The controller 8 may determine whether the opposite image reaching ratio r2 is higher than the second ratio.

When determining that the opposite image reaching ratio r2 is lower than or equal to the second ratio, the controller 8 may maintain the first shutter cells sa in the light transmissive state. When determining that the opposite image reaching ratio r2 is higher than the second ratio, the controller 8 may change the first shutter cells sa into the light attenuating state. After the controller 8 changes the first shutter cells sa into the light attenuating state, the image light from the right-eye image is attenuated by the first shutter cells sa and is less likely to reach the pupil of the left eye. This may decrease image light reaching the pupil of the left eye, but may reduce crosstalk.

The second ratio may be determined as appropriate based on the degree of crosstalk and the amount of image light. At a lower second ratio, the amount of image light decreases but crosstalk can be reduced. At a higher second ratio, crosstalk increases but the amount of image light can be increased.

In the 3D display device 2 in the second example, the controller 8 controls the first shutter cells sa into the light attenuating state. This can decrease the amount of image light but can reduce crosstalk. In this state, the amount of image light reaching the pupil of each eye of the user decreases. Under such control, the illuminance level around the user's eyes is lower than the illuminance level in the reference state. However, the user can view an image with less light at a lower illuminance level around the user's eyes. The user can thus properly view the 3D image with less image light reaching the pupils.

Third Example

In a third example described below with reference to FIG. 8, the controller 8 determines the pupil diameter DP of the user based on the illuminance level and controls both the display panel 6 and the shutter panel 7 based on the pupil diameter DP. More specifically, the controller 8 determines, based on the pupil diameter DP, any shutter cell s or any first shutter cell sa, among the shutter cells s controlled in the light transmissive state, having a part receiving image light from the right-eye image toward the pupil of the user's left eye at a ratio higher than a third ratio after the pupil diameter DP changes. The controller 8 changes a part of each first shutter cell sa from the light transmissive state to the light attenuating state. The controller 8 changes an image to be displayed by the subpixel P that emits image light reaching the remaining part of each first shutter cell sa from the right-eye image to the left-eye image. The third example will be described in more detail below.

In response to the obtainer 4 obtaining an illuminance level, the controller 8 may first determine the pupil diameter DP based on the illuminance level. The controller 8 specifically determines the pupil diameter DP in the same manner as in the first example.

In the same manner as in the second example, the controller 8 may determine any first shutter cell sa based on the pupil diameter DP. In the example in FIG. 8, the image light from a part of the right-eye image displayed by the subpixel P10 travels toward the pupil of the left eye between two dot-and-dash lines to reach a part of the shutter cell s1. The image light from a part of the right-eye image displayed by the subpixel P6 travels toward the pupil of the left eye between two two-dot chain lines to reach the shutter cell s5. Thus, the controller 8 determines, among the shutter cells s1 to s5 controlled in the light transmissive state, the shutter cells s1 and s5 as the first shutter cells sa.

In FIG. 8, the viewable section 6aL0 is the viewable section 6aL when the pupil of the eye is hypothetically a point (more specifically, when the pupil diameter DP is zero). The viewable section 6aL1 is the viewable section 6aL when the pupil diameter DP of the eye is finite and the display panel 6 and the shutter panel 7 are in the reference state. The viewable section 6aL2 is the viewable section 6aL when the pupil diameter DP of the eye is finite and the controller 8 controls the shutter panel 7 based on the pupil diameter in the manner described in this example.

The controller 8 calculates the opposite image reaching ratio r2 in the same manner as in the second example. The controller 8 may determine whether the opposite image reaching ratio r2 is higher than the third ratio. The third ratio may be the same as or different from the second ratio. Similarly to the second ratio, the third ratio may be determined as appropriate based on the degree of crosstalk and the amount of image light. At a lower third ratio, the amount of image light decreases but crosstalk can be reduced. At a higher third ratio, crosstalk increases but the amount of image light can be increased.

When determining that the opposite image reaching ratio r2 is lower than or equal to the third ratio, the controller 8 may control the first shutter cells sa to remain in the light transmissive state. When determining that the opposite image reaching ratio r2 is higher than the third ratio, the controller 8 may control, among the first shutter cells sa, the first shutter cell sa at one end of a set of second shutter cells sb in the direction corresponding to the parallax direction to change into the light attenuating state. The second shutter cells sb are shutter cells s that transmit image light from the left-eye image toward the pupil of the left eye (shutter cells s2 to s4 in the example in FIG. 8). In the example in FIG. 8, the controller 8 controls, among the shutter cells s1 and s5 as the first shutter cells sa, the shutter cell s1 (hatched in FIG. 8) to change into the light attenuating state. The controller 8 controls the shutter cell s5 as a first shutter cell sa at another end of the set of second shutter cells sb in the direction corresponding to the parallax direction to remain in the light transmissive state.

The controller 8 may change, from the right-eye image to the left-eye image, an image displayed by the subpixel P emitting image light reaching the first shutter cell sa controlled to remain in the light transmissive state among the first shutter cells sa. In the example in FIG. 8, the subpixel P6 displays the right-eye image but emits image light traveling toward the pupil of the left eye and reaching the shutter cell s5 being the first shutter cell sa controlled to remain in the light transmissive state. The controller 8 causes the subpixel P6 to display the left-eye image.

A part of the right-eye image is changed to be a part of the left-eye image as described above to decrease the area of the right-eye image and increase the area of the left-eye image viewable with the pupil of the left eye, thus reducing crosstalk. Although this seemingly increases the area of the left-eye image viewable with the pupil of the right eye, the area of the left-eye image viewable with the pupil of the right eye does not increase. This will be described below. As described above, the first shutter cell sa at one end of the set of second shutter cells sb in the direction corresponding to the parallax direction (the shutter cell s1 in the example in FIG. 8) is controlled in the light attenuating state. Thus, the image light from the left-eye image that has been the image light from the right-eye image traveling toward the pupil of the right eye reaches the first shutter cell sa controlled in the light attenuating state (the shutter cell s1 in the example in FIG. 8). This attenuates the image light from the left-eye image traveling toward the pupil of the right eye. Thus, the area of the left-eye image viewable with the pupil of the right eye does not increase, thus avoiding an increase in crosstalk.

The controller 8 may change, from the left-eye image to the right-eye image, an image displayed by the subpixel P emitting image light reaching the first shutter cell sa controlled to remain in the light transmissive state among the first shutter cells sa. In the example in FIG. 8, the subpixel P1 displays the left-eye image but emits image light traveling toward the pupil of the right eye and reaching the shutter cell s5 being the first shutter cell sa controlled to remain in the light transmissive state. The controller 8 causes the subpixel P1 to display the right-eye image.

A part of the left-eye image is changed to be a part of the right-eye image as described above to decrease the area of the left-eye image and increase the area of the right-eye image viewable with the pupil of the right eye, thus reducing crosstalk. Although this seemingly increases the area of the right-eye image viewable with the pupil of the left eye, the area of the right-eye image viewable with the pupil of the left eye does not increase. This will be described below. As described above, the first shutter cell sa at one end of the set of second shutter cells sb in the direction corresponding to the parallax direction (the shutter cell s1 in the example in FIG. 8) is controlled in the light attenuating state. Thus, the image light from the right-eye image that has been the image light from the left-eye image traveling toward the pupil of the left eye reaches the first shutter cell sa controlled in the light attenuating state (the shutter cell s1 in the example in FIG. 8). This attenuates the image light from the right-eye image traveling toward the pupil of the left eye. Thus, the area of the right-eye image viewable with the pupil of the left eye does not increase, thus avoiding an increase in crosstalk.

In the third example, the controller 8 controls a first shutter cell sa in the light attenuating state. This can decrease the amount of image light but can reduce crosstalk while avoiding a decrease in the amount of image light. The controller 8 controls some of the first shutter cells sa into the light attenuating state, rather than all of the first shutter cells sa, and thus avoids decrease in the amount of image light. The controller 8 changes a part of the right-eye image to be a part of the left-eye image. This reduces crosstalk while allowing image light to be less likely to decrease than in the second example.

Second Embodiment

A second embodiment of the present disclosure will now be described with reference to the drawings.

Figure 9:
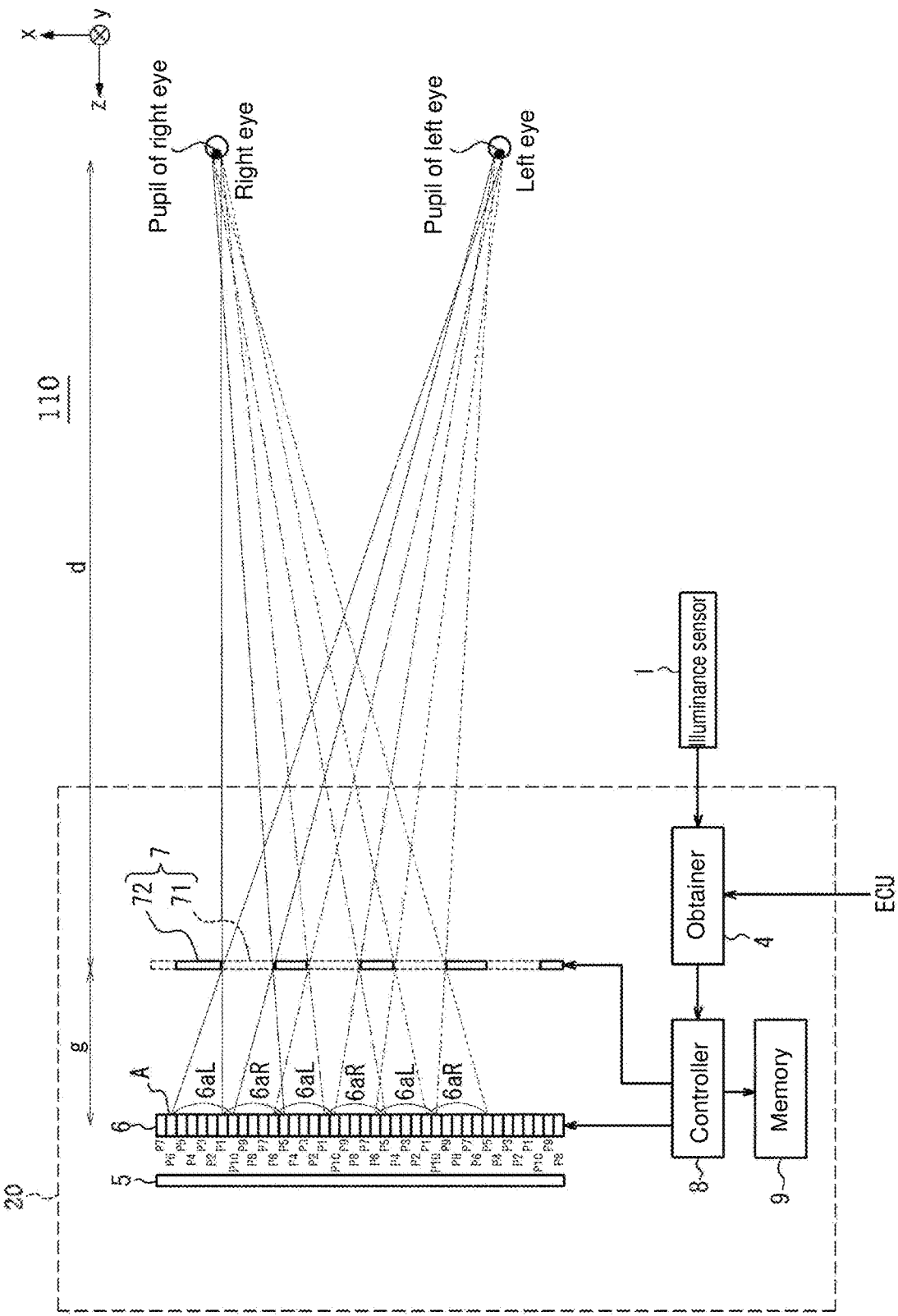
FIG. 9 is a diagram of a 3D display system according to a second embodiment viewed in a vertical direction.

As shown in FIG. 9, a 3D display system 110 according to the second embodiment of the present disclosure includes an illuminance sensor 1 and a 3D display device 20. The illuminance sensor 1 in the second embodiment is the same as the illuminance sensor 1 in the first embodiment.

The 3D display device 20 in the second embodiment includes an obtainer 4, an illuminator 5, a display panel 6, a shutter panel 7, a controller 8, and a memory 9. The obtainer 4, the illuminator 5, the display panel 6, and the shutter panel 7 in the second embodiment are the same as the obtainer 4, the illuminator 5, the display panel 6, and the shutter panel 7 in the first embodiment. The controller 8 in the second embodiment includes a processor similarly to the controller 8 in the first embodiment. The memory 9 stores control information including at least one of image control information or shutter control information.

First Example

The memory 9 stores image control information. The image control information in a first example associates the illuminance level and the type of image to be displayed by each subpixel. The image control information is generated by any processor predetermining the type of image (a left-eye image, a right-eye image, or a black image) to be displayed by each subpixel based on an illuminance level in the manner described in the first example of the first embodiment.

In this structure, in response to the obtainer 4 receiving an illuminance level, the controller 8 extracts, for each subpixel, the type of image associated with the illuminance level from the image control information stored in the memory 9. The controller 8 displays the image of the type extracted for each pixel.

The structure in the first example of the second embodiment may reduce crosstalk as in the first example of the first embodiment, thus allowing the user to properly view a 3D image. In the first example of the second embodiment, the controller 8 simply extracts the type of image to be displayed by each subpixel associated with the illuminance level stored in the memory 9. The controller 8 thus avoids computation to determine, based on the illuminance level, the pupil diameter DP, the left viewable sections 6aL1 and the right viewable sections 6aR1, and the type of image to be displayed by each subpixel. Thus, the controller 8 in the second embodiment may have a less processing load than in the first embodiment.

Second Example

The memory 9 stores shutter control information. The shutter control information in a second example associates the illuminance level and the state (a light transmissive state or a light attenuating state) of each shutter cell s. The shutter control information is generated by any processor predetermining the state of each shutter cell s based on the illuminance level in the manner described in the second example of the first embodiment.

In this structure, in response to the obtainer 4 receiving an illuminance level, the controller 8 controls each shutter cell s into the state associated with the illuminance level based on the shutter control information stored in the memory 9.

The structure in the second example of the second embodiment may reduce crosstalk as in the second example of the first embodiment, thus allowing the user to properly view a 3D image. The user can thus properly view a 3D image. In the second example of the second embodiment, the 3D display device 20 simply extracts the control state of each shutter cell s associated with the illuminance level stored in the memory 9. The controller 8 thus avoids computation to determine the pupil diameter DP and the control state of each shutter cell s based on the illuminance level. Thus, the controller 8 in the second embodiment may have a less processing load than in the first embodiment.

Third Example

The memory 9 stores the image control information and the shutter control information. The image control information in a third example is generated by any processor predetermining the type of image to be displayed by each subpixel based on the illuminance level in the manner described in the third example of the first embodiment. The shutter control information in the third example is generated by any processor predetermining the state of each shutter cell s based on the illuminance level in the manner described in the third example of the first embodiment.

In this structure, in response to the obtainer 4 receiving an illuminance level, the controller 8 extracts, for each subpixel, the type of image associated with the illuminance level from the image control information stored in the memory 9. The controller 8 displays the image of the type extracted for each pixel. In response to the obtainer 4 receiving an illuminance level, the controller 8 controls each shutter cell s into the state associated with the illuminance level based on the shutter control information stored in the memory 9.

In the third example of the second embodiment, the 3D display device 20 controls fewer shutter cells into the light attenuating state than in the second example, and thus avoids decrease in the amount of image light reaching the pupil of the left eye. In the third example of the second embodiment, the controller 8 simply extracts the type of image to be displayed by each subpixel and the control state of each shutter cell s associated with the illuminance level stored in the memory 9. The controller 8 thus avoids computation to determine, based on the illuminance level, the pupil diameter DP, the image to be displayed by each subpixel, and the control state of each shutter cell s. Thus, the controller 8 may have a less processing load than in the first embodiment.

Although the above embodiments are described as typical examples, various modifications and substitutions to the embodiments are apparent to those skilled in the art without departing from the spirit and scope of the present disclosure. Thus, the above embodiments should not be construed to be restrictive, but may be variously modified or altered within the scope of the present disclosure. For example, multiple structural blocks described in the above embodiments may be combined into a structural block, or each structural block may be divided.

In the above embodiments, the 3D display system 100 may include a lamp. The controller 8 may turn off the lamp in accordance with an illuminance level obtained by the obtainer 4. In response to the lamp being turned on, the obtainer 4 may obtain an illuminance level with the lamp being turned on. The controller 8 may perform the process described above based on the illuminance level.

In the above embodiments, the controller 8 may control the size of the image to appear on the display panel 6 based on the pupil diameter DP. More specifically, the controller 8 may control the image to be at least partly larger as the pupil diameter DP increases. For example, the controller 8 may increase the size of an object in the image as the pupil diameter DP increases.

Figure 10:
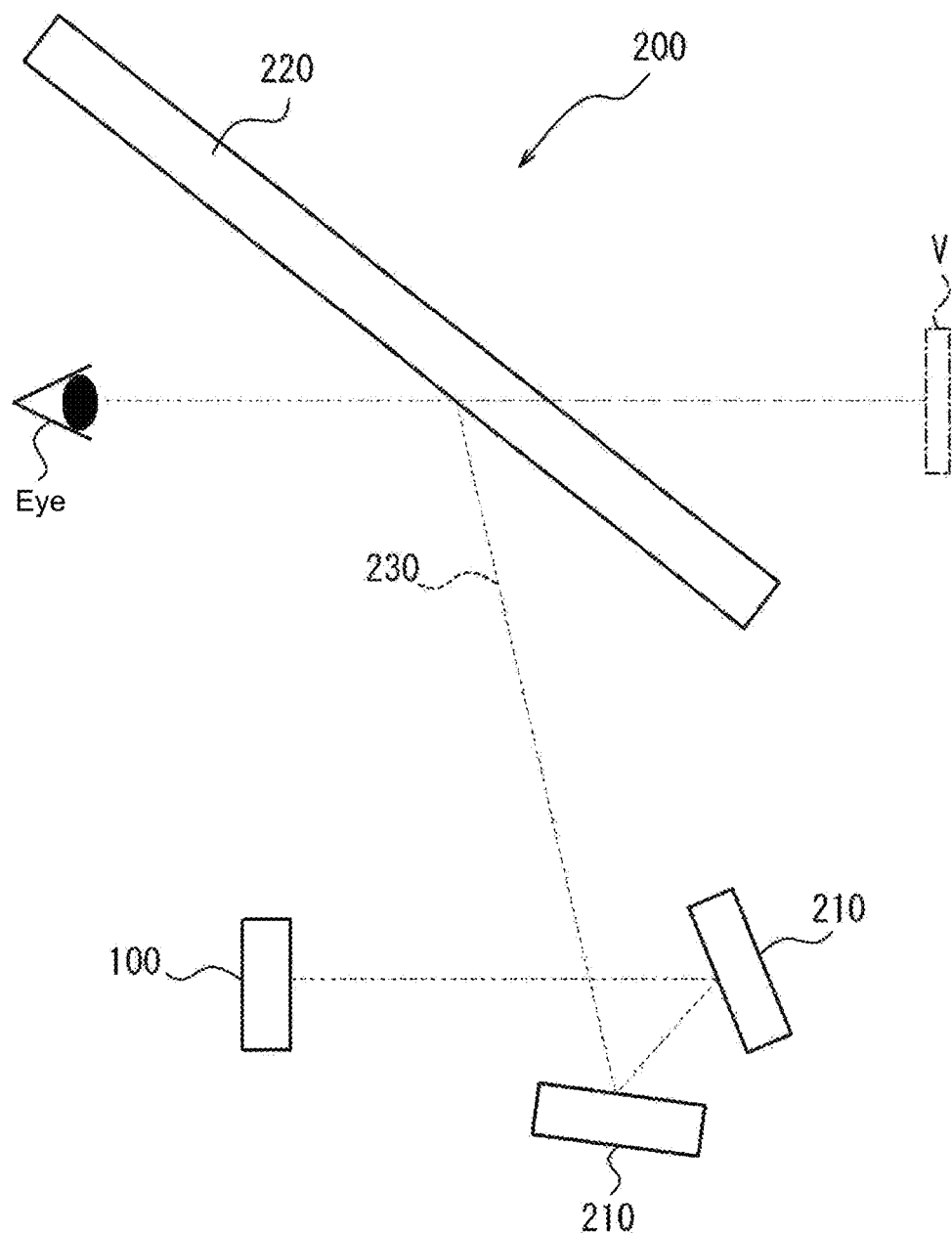
FIG. 10 is a diagram of an example head-up display (HUD) incorporating the 3D display system shown in FIG. 1.

As shown in FIG. 10, the 3D display system 100 in the first embodiment may be incorporated in a head-up display system 200. The head-up display system 200 is also referred to as an HUD system 200. The HUD system 200 includes the 3D display system 100, reflectors 210, and an optical member 220. The HUD system 200 directs image light emitted from the 3D display system 100 to reach the optical member 220 with the reflectors 210. The HUD system 200 directs image light reflected from the optical member 220 to reach the left and right eyes of a user. In other words, the HUD system 200 directs image light to travel from the 3D display device 2 to the user's left and right eyes along an optical path 230 indicated by a broken line. The user can view image light reaching the eyes along the optical path 230 as a virtual image V. The 3D display device 2 controls the display in accordance with the positions of the user's left and right eyes to provide a stereoscopic view in accordance with the user's movement. In the 3D display system 100 incorporated in the head-up display system 200, the illuminance sensor 1 detects the ambient illuminance level around the virtual image V viewed with the user's eyes. Similarly, the 3D display system 110 in the second embodiment may be incorporated in the HUD system 200.

Figure 11:
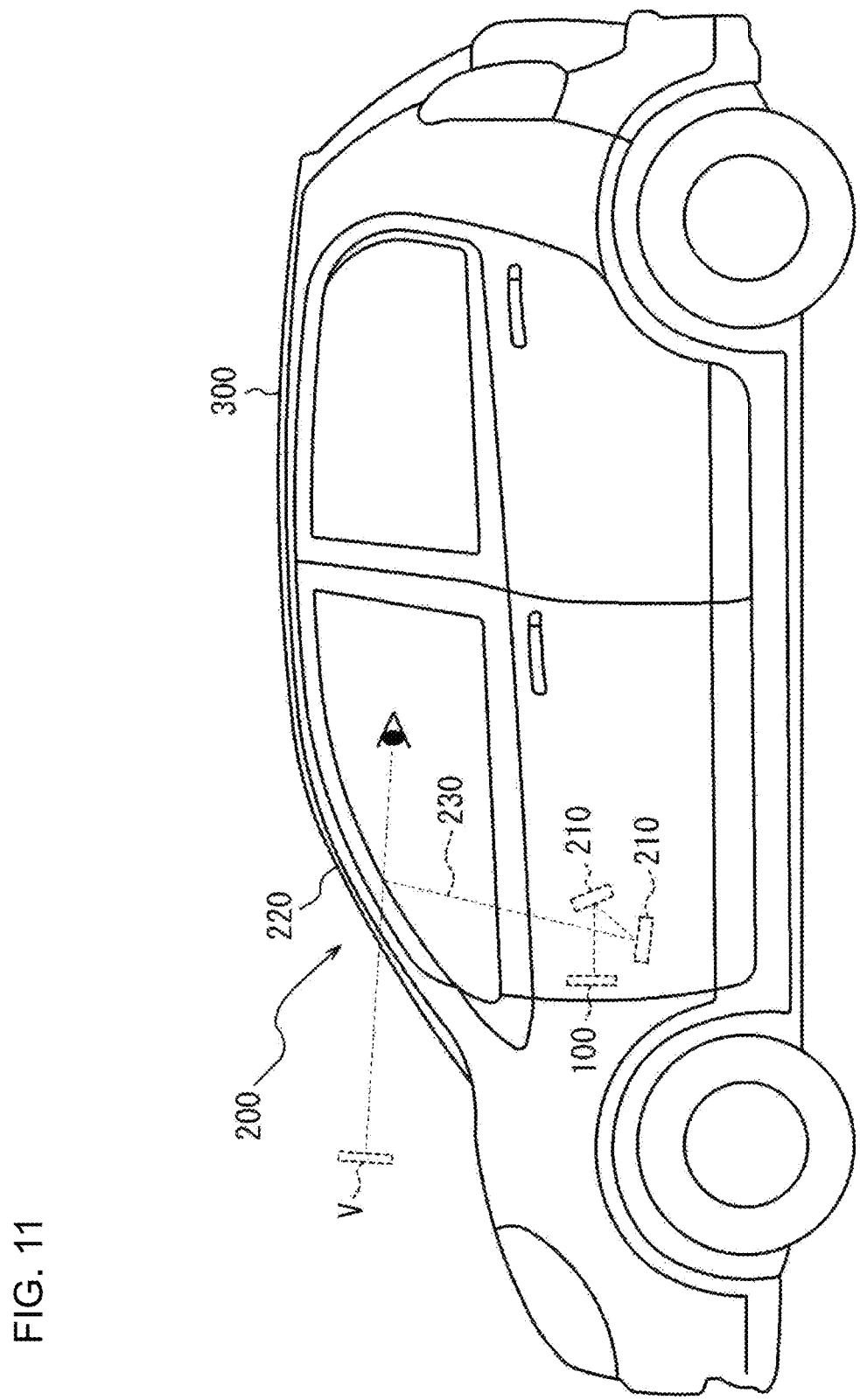
FIG. 11 is a diagram of an example movable object incorporating the HUD shown in FIG. 10.

As shown in FIG. 11, the HUD system 200 incorporating the 3D display system 100 in the first embodiment may be mounted on a movable object 300. The HUD system 200 may include components that also serve as devices or components included in the movable object 300. For example, the movable object 300 may include a windshield that servers as the optical member 220. The devices or components of the HUD system 200 serving as devices or components included in the movable object 300 may be referred to as HUD modules or 3D display components. Similarly, the HUD system 200 incorporating the 3D display system 110 in the second embodiment may be mounted on the movable object 300.

The present disclosure may be implemented in the following forms.

A three-dimensional display device according to one or more embodiments of the present disclosure includes a display panel, a shutter panel, an obtainer, and a controller. The display panel includes a plurality of subpixels that display a parallax image including a first image and a second image having parallax between the images. The shutter panel defines a ray direction of image light from the parallax image emitted from the display panel. The obtainer obtains an ambient illuminance level around an image viewed by a user. The controller determines a pupil diameter of the user based on the ambient illuminance level and controls at least one of the display panel or the shutter panel based on the pupil diameter.

The 3D display device according to one or more embodiments of the present disclosure allows the user to properly view a 3D image independently of changes in the ambient illuminance level around an image viewed by the user.

A head-up display system according to one or more embodiments of the present disclosure includes a three-dimensional display device. The three-dimensional display device includes a display panel, a shutter panel, an obtainer, and a controller. The display panel includes a plurality of subpixels that display a parallax image including a first image and a second image having parallax between the images. The shutter panel defines a ray direction of image light from the parallax image emitted from the display panel. The obtainer obtains an ambient illuminance level around an image viewed by a user. The controller determines a pupil diameter of the user based on the ambient illuminance level and controls at least one of the display panel or the shutter panel based on the pupil diameter.

A movable object according to one or more embodiments of the present disclosure includes a head-up display system. The head-up display system includes a three-dimensional display device. The three-dimensional display device includes a display panel, a shutter panel, an obtainer, and a controller. The display panel includes a plurality of subpixels that display a parallax image including a first image and a second image having parallax between the images. The shutter panel defines a ray direction of image light from the parallax image emitted from the display panel. The obtainer obtains an ambient illuminance level around an image viewed by a user. The controller determines a pupil diameter of the user based on the ambient illuminance level and controls at least one of the display panel or the shutter panel based on the pupil diameter.

The elements in the present disclosure implement operations that are implementable. The operations implemented by the elements in the present disclosure can thus refer to the elements operable to implement the operations. The elements implementing operations in the present disclosure can be expressed as the elements operable to implement the operations. The operations implementable by the elements in the present disclosure can be expressed as elements including or having the elements operable to implement the operations. A first element causing a second element to implement an operation in the present disclosure can refer to the first element operable to cause the second element to perform the operation. A first element causing a second element to perform an operation in the present disclosure can be expressed as the first element operable to control the second element to perform the operation. Operations implemented by the elements in the present disclosure that are not described in the claims are understood as being optional operations.

Although the present disclosure has been described in detail, the present disclosure is not limited to the embodiments described above, and may be changed or modified variously without departing from the spirit and scope of the present disclosure. The embodiments described above are thus merely illustrative in all respects. The scope of the present disclosure is defined not by the description given above but by the claims. Any modifications and alterations contained in the claims fall within the scope of the present disclosure.

The invention claimed is:

1. A three-dimensional display device, comprising:
   a display panel including a plurality of subpixels configured to display a parallax image including a first image and a second image having parallax between the first and second images;
   a shutter panel configured to define a ray direction of image light from the parallax image emitted from the display panel;
   an obtainer configured to obtain an ambient illuminance level around a user; and
   a controller configured to determine a pupil diameter of a first eye or a second eye of the user based on the ambient illuminance level and to control at least one of the display panel or the shutter panel based on the pupil diameter,
   wherein
   the controller is configured to determine, based on the pupil diameter, a first viewable section and a second viewable section defined on the display panel by the shutter panel, the first viewable section allows emission of image light reaching a pupil of the first eye of the user, and the second viewable section allows emission of image light reaching a pupil of the second eye of the user, the shutter panel includes a plurality of shutter cells controllable into either a light transmissive state or a light attenuating state, and the controller is configured to
(i) determine, based on a change of the pupil diameter, among subpixels displaying the second image, a subpixel having a part included in the first viewable section at a first ratio higher than a first predetermined ratio, and change the second image displayed by the determined subpixel to a black image, or
(ii) determine, based on the change of the pupil diameter, among shutter cells controlled to be in the light transmissive state, a shutter cell having a part receiving image light from the second image toward the pupil of the first eye of the user at a second ratio higher than a second predetermined ratio, and control the determined shutter cell into the light attenuating state.

2. A head-up display system, comprising:
the three-dimensional display device according to claim 1.

3. The three-dimensional display device according to claim 1, wherein
the controller is configured to
determine, based on the change of the pupil diameter, among the subpixels displaying the second image, the subpixel having the part included in the first viewable section at the first ratio higher than the first predetermined ratio, and
change the second image displayed by the determined subpixel to the black image.

4. The three-dimensional display device according to claim 3, wherein
the controller is configured to
determine whether the first ratio is higher than the first predetermined ratio,
in response to the first ratio being less than or equal to the first predetermined ratio, cause the subpixel of the subpixels displaying the second image but having the part included in the first viewable section to continue to display the second image.

5. The three-dimensional display device according to claim 4, wherein
the first ratio is determined based on a degree of crosstalk and an amount of the image light.

6. The three-dimensional display device according to claim 1, wherein
the controller is configured to
determine, based on the change of the pupil diameter, among the shutter cells controlled to be in the light transmissive state, the shutter cell having the part receiving image light from the second image toward the pupil of the first eye of the user at the second ratio higher than the second predetermined ratio, and
control the determined shutter cell into the light attenuating state.

7. The three-dimensional display device according to claim 6, wherein
the controller is configured to
determine whether the second ratio is higher than the second predetermined ratio,
in response to the second ratio being less than or equal to the second predetermined ratio, maintain the shutter cell of the shutter cells controlled to be in the light transmissive state but having the part receiving image light from the second image toward the pupil of the first eye of the user in the light transmissive state.

8. The three-dimensional display device according to claim 7, wherein the second ratio is determined based on a degree of crosstalk and an amount of the image light.

9. The three-dimensional display device according to claim 1, wherein
the display panel includes an active area configured to display the parallax image, the active area including the plurality of subpixels that form subpixel groups, and
each of the subpixel groups includes a predetermined number of subpixels in horizontal and vertical directions.

10. The three-dimensional display device according to claim 9, wherein
the shutter panel is planar along the active area of the display panel and spaced away from the active area by a predetermined distance,
the plurality of shutter cells of the shutter panel forms shutter cell groups,
each of the shutter cell groups includes a predetermined number of shutter cells in the horizontal and vertical directions, and
the shutter cells in the shutter cell groups are arranged to correspond to an arrangement of the subpixels in the subpixel groups.

11. A three-dimensional display device, comprising:
a display panel including a plurality of subpixels configured to display a parallax image including a first image and a second image having parallax between the first and second images;
a shutter panel configured to define a ray direction of image light from the parallax image emitted from the display panel;
an obtainer configured to obtain an ambient illuminance level around a user; and
a controller configured to determine a pupil diameter of the user based on the ambient illuminance level and to control at least one of the display panel or the shutter panel based on the pupil diameter,
wherein
the shutter panel includes a plurality of shutter cells controllable into either a light transmissive state or a light attenuating state, and
the controller
determines, based on the pupil diameter, a plurality of first shutter cells, among shutter cells controlled in the light transmissive state, each having a part receiving image light from the second image toward a pupil of a first eye of the user at a ratio higher than a third ratio after the pupil diameter changes,
changes the light transmissive state of at least one of the determined plurality of first shutter cells to the light attenuating state, and
changes, from the second image to the first image, an image displayed by a subpixel emitting image light reaching the other first shutter cell(s) of the determined plurality of first shutter cells.

12. A movable object, comprising:
a head-up display system, the head-up display system including a three-dimensional display device, the three-dimensional display device including a display panel including a plurality of subpixels configured to display a parallax image including a first image and a second image having parallax between the images, a shutter panel configured to define a ray direction of image light from the parallax image emitted from the display panel, an obtainer configured to obtain an ambient illuminance level around a user, and a controller configured to determine a pupil diameter of a first eye or a second eye of the user based on the ambient illuminance level and to control at least one of the display panel or the shutter panel based on the pupil diameter, wherein the controller is configured to determine, based on the pupil diameter, a first viewable section and a second viewable section defined on the display panel by the shutter panel, the first viewable section allows emission of image light reaching a pupil of the first eye of the user, and the second viewable section allows emission of image light reaching a pupil of the second eye of the user, the shutter panel includes a plurality of shutter cells controllable into either a light transmissive state or a light attenuating state, and the controller is configured to (i) determine, based on a change of the pupil diameter, among subpixels displaying the second image, a subpixel having a part included in the first viewable section at a first ratio higher than a first predetermined ratio, and change the second image displayed by the determined subpixel to a black image, or (ii) determine, based on the change of the pupil diameter, among shutter cells controlled to be in the light transmissive state, a shutter cell having a part receiving image light from the second image toward the pupil of the first eye of the user at a second ratio higher than a second predetermined ratio, and control the determined shutter cell into the light attenuating state.

* * * * *